United States Patent Office 3,231,816
Patented Jan. 25, 1966

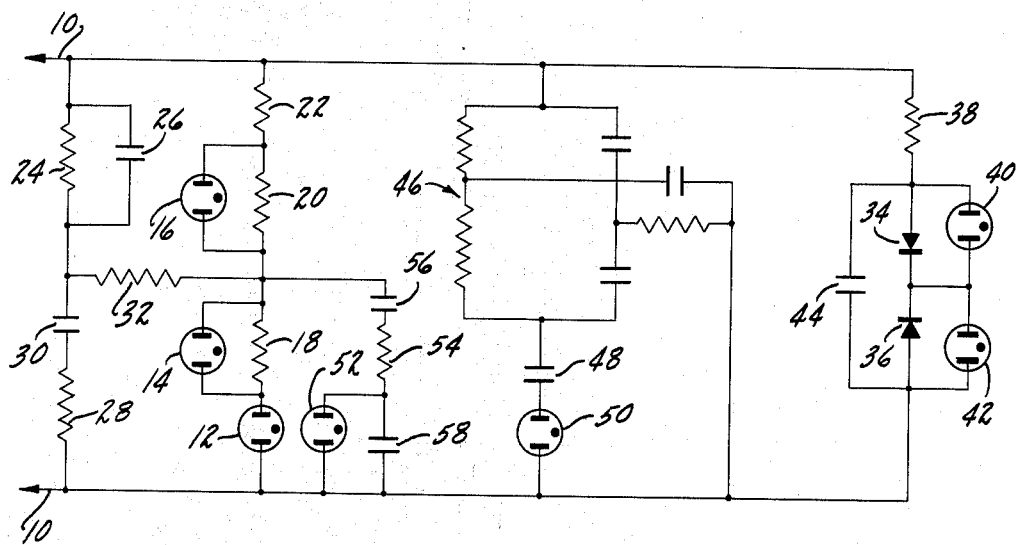

3,231,816
VOLTAGE, POLARITY AND FREQUENCY TESTER HAVING COMPENSATING NETWORK FOR RESPONSE TO EITHER DIRECT OR ALTERNATING VOLTAGE
Dean Oehlerking, Sycamore, Ill., assignor to Ideal Industries, Inc., Sycamore, Ill., a corporation of Delaware
Filed Feb. 12, 1962, Ser. No. 172,513
7 Claims. (Cl. 324—78)

This invention relates to a voltage testing circuit designed to give an indication of voltage amplitude, polarity and frequency.

A primary purpose of this invention is a compact, simple and efficient voltage tester of the type described which gives a visual indication of the principal parameters of the voltage source being tested.

Another purpose is a voltage tester of the type described which utilizes a compensation network between the input and the voltage amplitude indicating bulbs so that the peak voltage applied to the bulbs, whether the input be A.C. or D.C., is the same.

Another purpose is a voltage testing circuit of the type described which provides a regulated voltage to the frequency indicator to prevent false readings.

Other purposes will appear in the ensuing specification, drawing and claims.

The invention is illustrated diagrammatically in the attached circuit diagram.

The input to the voltage tester circuit is at 10. As is normal in a voltage testing circuit, the input may be in the form of probes attached at the ends of flexible wires so that the voltage in sockets or other receptacles, as well as the voltage at various points in a circuit, may be easily tested. Across the input 10 are three neon bulbs or gas indicating bulbs 12, 14 and 16. As shown herein the bottom bulb 12 will fire to indicate an input voltage of approximately 110 volts, bulb 14 will fire to indicate an input voltage of approximately 220 volts, and bulb 16 will fire to indicate an input voltage of approximately 440 volts. Because the bulbs are arranged somewhat in series, each bulb will fire at its own rated voltage, as well as higher voltages. For example, when the input voltage is roughly 440 volts, all of the bulbs will be lit.

Bulb 14 is in parallel with a resistor 18 and bulb 16 is in parallel with a resistor 20. The circuit is arranged so that there is no current flowing through any of the bulbs until bulb 12 fires. After bulb 12 has fired and current is flowing through the circuit, bulbs 14 and 16 will fire as soon as their required firing voltage is developed across the resistors 18 and 20. A resistor 22 may be positioned in the circuit generally in series with the resistors 18 and 20 and with the bulb 12.

Neon bulbs of the type which may be used herein fire at peak voltages. As the rated values of A.C. voltages are the R.M.S. voltages and not the peak voltages, some type of compensating network is necessary so that the bulbs will fire at the same voltage, whether it be A.C. or D.C. The particlular compensating network shown is designed to reduce the peak A.C. voltage at the input by the square root of 2, or to bring it down to its R.M.S. value. This compensating network may take the form of a resistor 24 in parallel with a capacitor 26, this combination being in series across the input with a resistor 28 and a capacitor 30. A resistor 32 may be bridged across above the capacitor 30 and to a point above the bulb 14.

The compensation network has no effect on bulb 16 or the 440 volt bulb, as normally direct current voltages in this range are not measured by a meter of this type.

When a D.C. voltage is applied, capacitor 30 has a high resistance, and all the input voltage exists across it. As such all of the input is across resistors 32, 18 and bulb 12. Since bulb 12 is a very high resistance until it fires, essentially all the input voltage is across it prior to firing. However, when an A.C. voltage is applied, the circuit is different, and the voltage applied to the bulbs 12 and 14 will be reduced by the square root of 2 compared to the voltage that is applied to these bulbs when a D.C. voltage is at the input.

Typical values for the components in the compensating network may be as follows: resistor 24, 36K ohms; capacitor 26, .01 microfarad; resistor 32, 47K ohms; capacitor 30, .047 microfarad; and resistor 28, 52K ohms. The compensating network is not frequency dependent, at least not sufficiently so as to have any effect in the 60–400 cycle per second range. Capacitor 26 provides a shunt for resistor 24 and capacitor 30 reduces the impedance of that leg of the voltage divider made up by capacitor 30 and resistor 28. When a direct current voltage is applied, all of this voltage will be across capacitor 30 so that the total direct current voltage appears between the top of capacitor 30 and the bottom of resistor 28. When an A.C. voltage is applied, that leg of the compensating network made up of resistor 24 and capacitor 26 reduces the voltage applied between the top of capacitor 30 and the bottom of resistor 28 so that a smaller voltage is actually applied to the indicating bulbs. An A.C. voltage is reduced by approximately the square root of 2 so that the same voltage appears from the top of capacitor 30 to the bottom of resistor 28, regardless of whether it is an A.C. or D.C. voltage applied at the input. Clearly the invention should not be limited to components of the above values.

In addition to indicating voltage amplitude at the particular point tested, it is desirable to know the polarity of this voltage, if it is a D.C. voltage. That portion of the circuit at the right of the attached figure is used for indicating voltage polarity. Suitable diodes 34 and 36 are connected in series with a resistor 38, with an opposite terminal of each diode connected together. Neon bulbs of the type described before are used for polarity indication and a bulb 40 is in parallel with diode 34 and a bulb 42 is in parallel with diode 36. A capacitor 44 may bridge both diodes to bypass A.C. currents.

Assuming that the top terminal is negative and the bottom is positive, there will be current flow through diode 36 and bulb 40. The voltage developed across the top diode or diode 34 is sufficient to ignite bulb 40 indicating that the top terminal is negative. When the bottom terminal is negative, the current flow is the reverse and bulb 42 will be ignited.

A further feature of the invention, particularly for military application, is means for indicating whether the frequency is either 400 cycles or 60 cycles. In many commercial applications this may not be necessary, as 60 cycles is the common and most-used frequency. However, the invention is not limited to indicating whether or not the frequency is 400 cycles or 60 cycles and includes any frequency indicators of the general type described. Connected across the input 10 is a twin-T filter indicated generally at 46. The filter 46 is conventional and need not be described in detail. Connected at the bottom of the filter 46 is a D.C. blocking capacitor 48 and an indicating bulb 50 of the type described. The twin-T filter 46 will remove all 60-cycle components and will pass other frequencies. When the voltage tester is being used in military applications, the voltage will either be at a frequency of 60 cycles or 400 cycles. By filtering out the 60 cycle, the bulb 50 will be ignited when the frequency is at the other frequency used, namely 400 cycles.

An indicating bulb 52 is used to designate a 60-cycle voltage. The top of the bulb 52 is connected through a resistor 54 and a capacitor 56 to a point above resistor 18 and bulb 14. In parallel with the bulb 52 is a capacitor 58. In operation the voltage at the top of bulb 14 will be clamped when bulbs 12 and 14 have fired. In this way the voltage applied to bulb 52 will be regulated, even though the input voltage may vary. For example, the input voltage may range anywhere from 104 to 484 volts, but the regulated voltage at the top of bulb 14 will go no higher than 220 volts. If such voltage regulation is not used, the 60-cycle indicator bulb may fire at 400-cycle voltages above 300 volts. Capacitor 56 may be about 50 times the size of capacitor 58, and acts as a blocking capacitor on D.C. inputs. The impedance of capacitor 58 at 60 cycles is roughly six times its impedance at 400 cycles. Bulb 52 will be arranged to fire at a voltage consistent with the voltage across capacitor 58 at 60 cycles, but not at 400 cycles. In other words, the impedance of the capacitor at 400 cycles will not produce a sufficient voltage to fire bulb 52.

The use, operation and function of the invention are as follows:

The circuit illustrated is used in a voltage testing device and includes means for indicating the amplitude of the voltage, the frequency of the voltage, if it is an A.C. voltage, and the polarity of the voltage, if it is a D.C. voltage. The voltage tester has particular application in quickly and simply determining the parameter of the output of power receptacles, but is obviously not limited to this application. The circuit may take a number of forms and is not limited to the arrangement of components shown.

The neon bulbs used for voltage amplitude measurement, as well as for the other indication, fire at peak voltage. Accordingly it is necessary to provide a compensating network between the input and the voltage amplitude indicators so that the bulbs will fire at the same voltage, whether it be A.C. or D.C. The voltage compensating network shown reduces the A.C. voltage by the square root of 2, or brings it down to the R.M.S. value, so that the peak voltage to the neon bulbs, whether it be A.C. or D.C. voltage, will be the same.

Of particular advantage is the simplicity of the voltage polarity indicator. A pair of small diodes are in series with one opposite terminal of each connected together. A neon bulb of the type described is connected in parallel with each diode. Current will flow through either one or the other of the diodes, depending upon the polarity, and the other diode will develop a sufficient voltage to ignite the bulb in parallel with it. A bypass capacitor may be used in connection with the polarity testing circuit, but this is not necessary.

In military applications it may be necessary to determine whether or not a voltage is at either 60 or 400 cycles, these being the principal frequencies used in military power supplies. As shown, a twin-T filter of a conventional type may be connected across the input and in series with a blocking capacitor and an indicating bulb. The twin-T filter removes any 60-cycle current in the network. The bulb 50 fires if the input voltage has a frequency of 400 cycles.

The 60-cycle filter arrangement includes means for providing a regulated voltage to the tube 52. If such an arrangement were not provided the 60-cycle indicator would be fired at 400-cycle voltages above 300 volts or so. The 60-cycle indicator includes a capacitor in parallel with the bulb, with the impedance of the capacitor being adjusted such that it will not develop sufficient voltage at 400 cycles to fire the bulb, but will develop a sufficient voltage at 60 cycles.

The invention should not be limited to the particular type of frequency indicator shown, as in some applications it may be desirable to use two twin-T filters, one for 400 cycles and one for 60 cycles. In addition, other frequency indicating arrangements may be satisfactory.

Whereas the preferred form of the invention has been shown and described herein, it should be realized that there are many modifications, substitutions and alterations thereto within the scope of the following claims.

I claim:

1. A voltage tester circuit including a pair of input terminals, a plurality of indicators connected in series across said input terminals, resistance means connected in parallel with at least some of said indicators for activating them at different input voltages, a resistive-capacitive compensating network connected between said input terminals and at least one of said indicators, said compensating network applying a D.C. voltage from said input terminals directly across said one indicator with no reduction in value from the amplitude at the input terminals, said compensating network applying an A.C. voltage from said input terminals across said one indicator and reducing the A.C. voltage applied across said one indicator to a value generally equal to the R.M.S. value of the input A.C. voltage, thereby providing generally the same voltage amplitude at said one indicator for both A.C. and D.C. voltage inputs, and a voltage polarity network connected across said input terminals including at least one indicator.

2. The circuit of claim 1 further characterized by at least one frequency indicating network connected across said input terminals, said network including an indicator and being responsive to 60-cycle inputs.

3. The circuit of claim 2 further characterized by a second frequency indicating network connected across said input terminals, said second network including an indicator and being responsive to 400-cycle inputs.

4. The circuit of claim 1 further characterized in that said compensating network includes a resistor and capacitor parallel combination in series across the input terminals with a resistor and capacitor.

5. The circuit of claim 4 further characterized in that said compensating network includes a resistor connected at one side to said resistor and capacitor parallel combination and at the other side to one of said plurality of indicators.

6. The circuit of claim 1 further characterized in that said indicators are gas bulbs.

7. The circuit of claim 6 further characterized in that there are three indicating bulbs, arranged to fire at input voltages of approximately 110, 220 and 440 volts.

References Cited by the Examiner
UNITED STATES PATENTS

| | | | |
|---|---|---|---|
| 503,589 | 8/1893 | Evershed | 324—126 |
| 2,410,081 | 10/1946 | Kenyon | 328—144 |
| 2,479,964 | 8/1949 | Pinkerton | 324—81 X |
| 2,695,395 | 11/1954 | Montgomery | 324—133 X |
| 2,762,977 | 9/1956 | Krueger | 324—122 X |
| 2,770,726 | 11/1956 | Fairwether | 324—78 X |
| 2,956,229 | 10/1960 | Henel | 324—122 X |

FOREIGN PATENTS

| | | |
|---|---|---|
| 1,210,441 | 3/1960 | France. |

OTHER REFERENCES

Martindale Electric Co. Ltd. (German printed disclosure), 1,089,064 September 15, 1960.

WALTER L. CARLSON, *Primary Examiner.*